Patented July 15, 1952

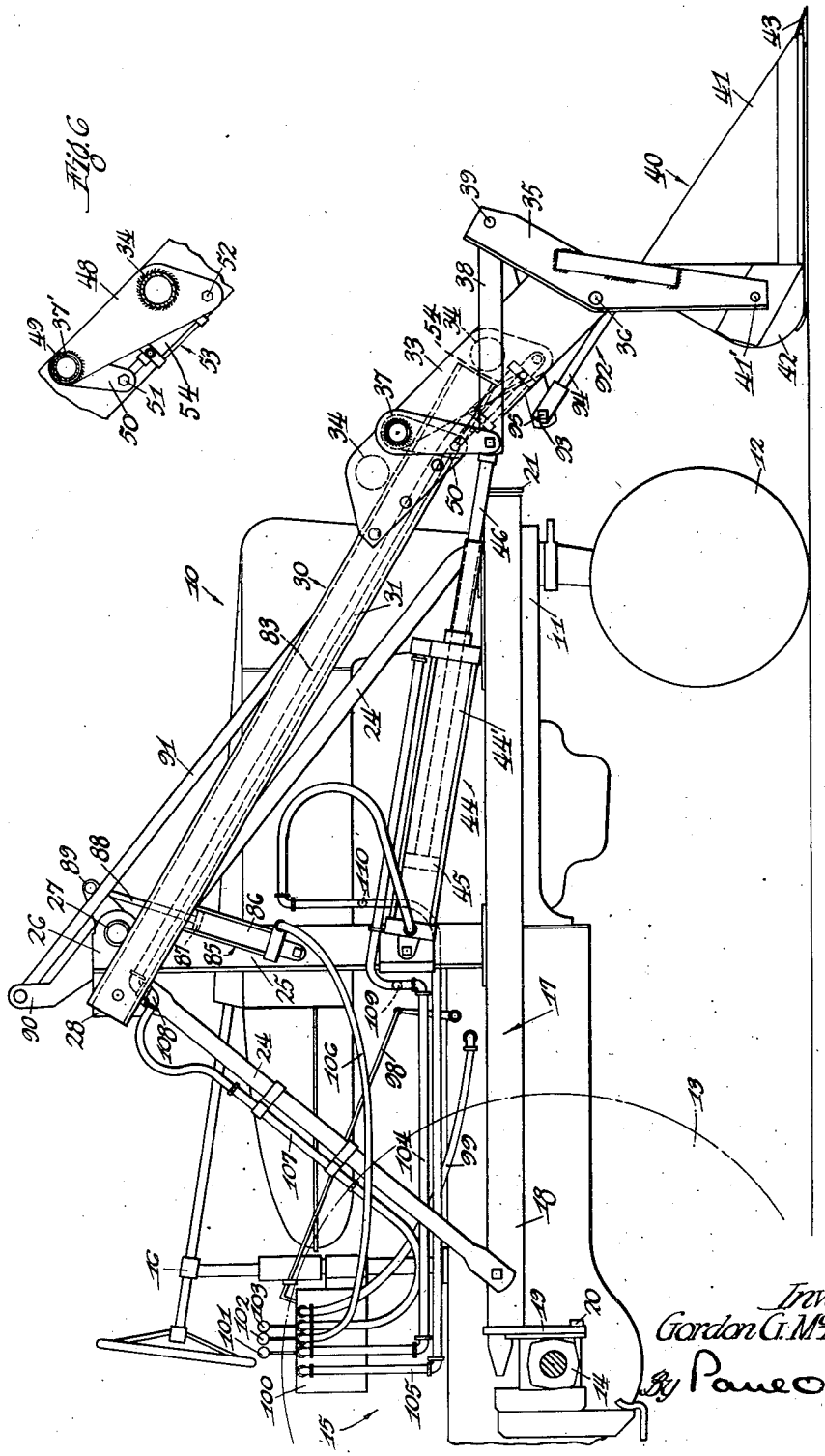

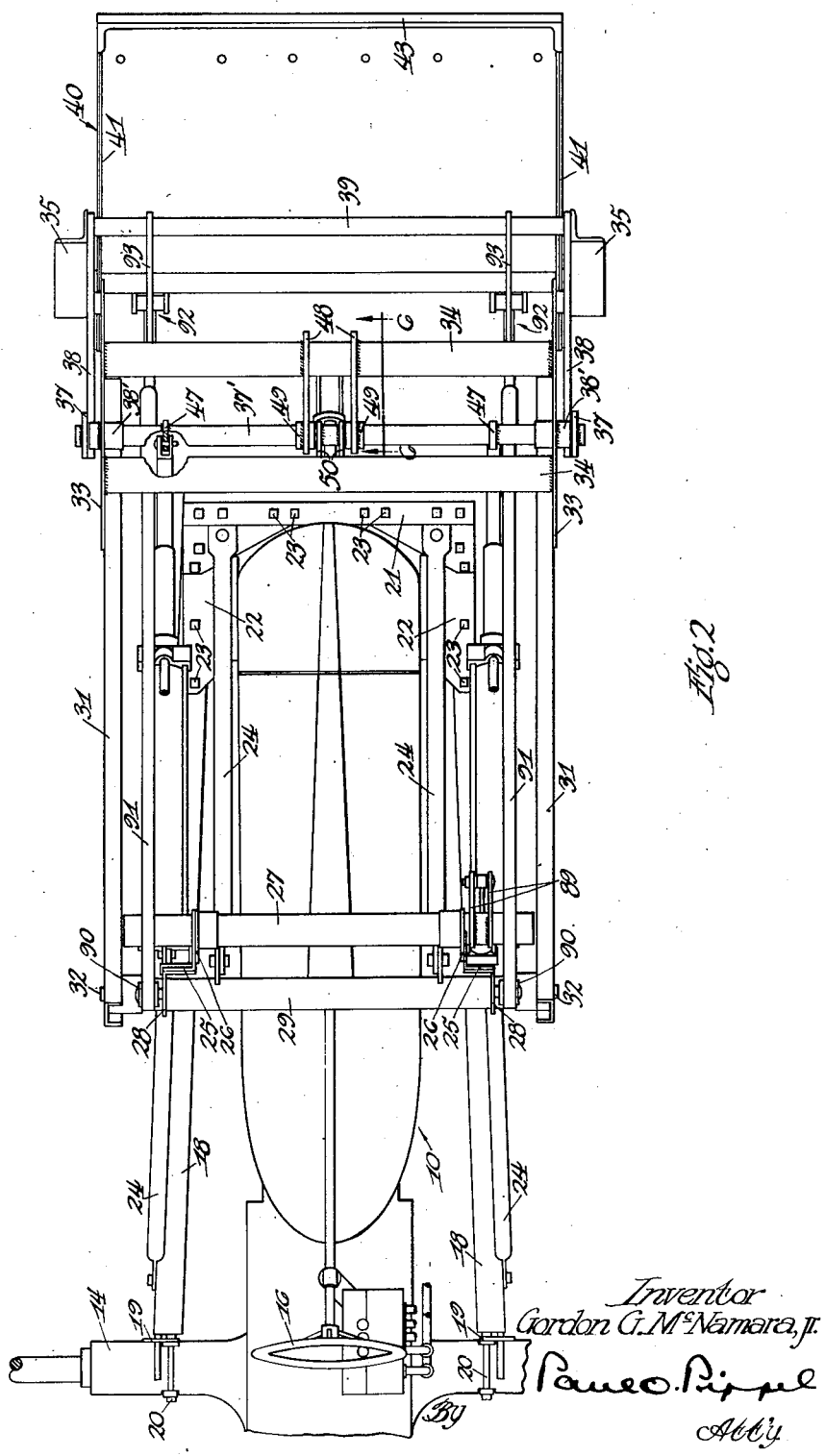

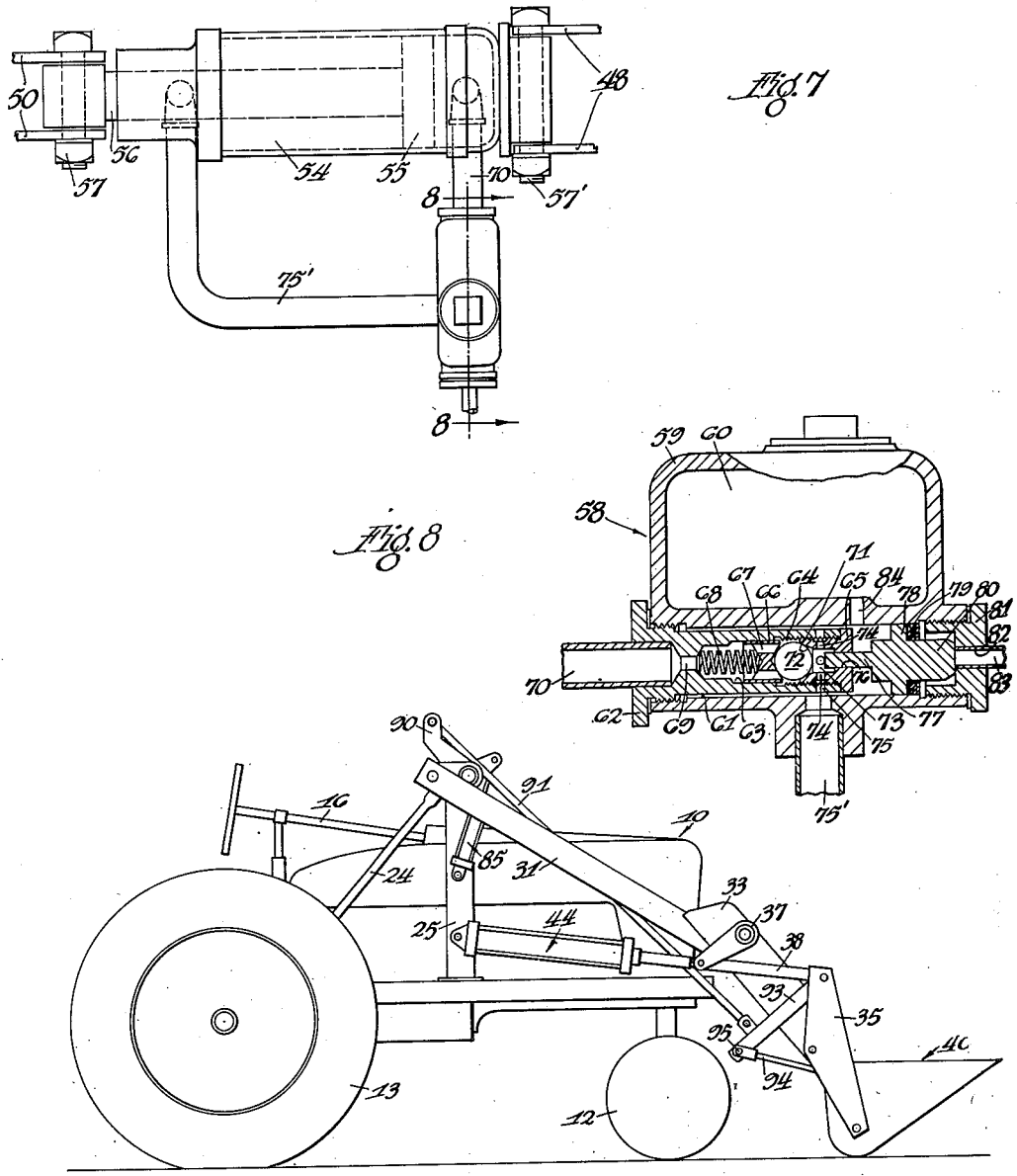

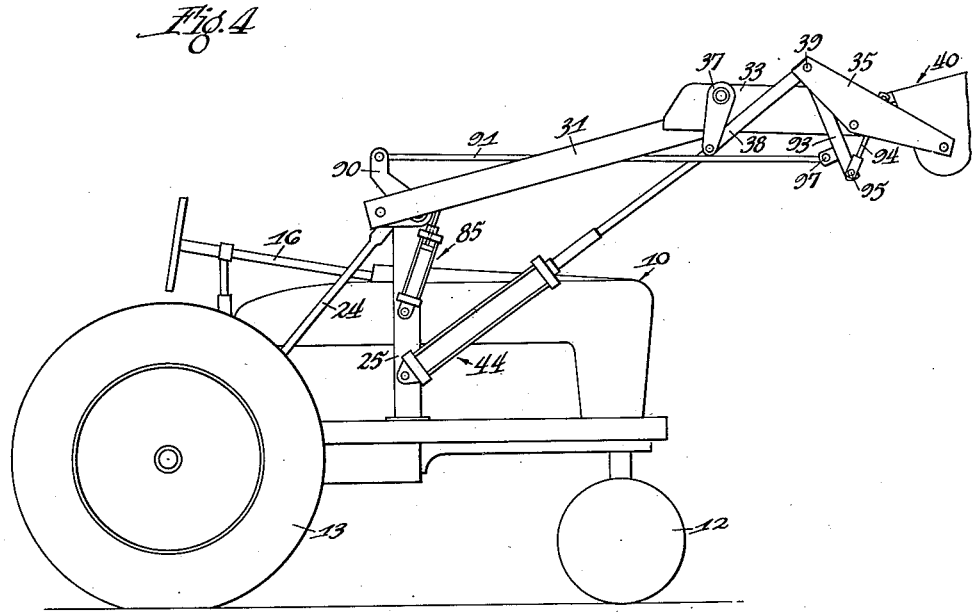

2,603,374

UNITED STATES PATENT OFFICE 2,603,374

LOADING ATTACHMENT FOR TRACTORS

Gordon G. McNamara, Jr., Chicago, Ill., assignor to International Harvester Company, a corporation of New Jersey Application December 27, 1946, Serial No. 718,675

11 Claims. (Cl. 214—140)

1

This invention relates to a load moving machine, and more specifically to a tractor-mounted loader.

The invention pertains especially to improvements in the structure of machines known as power loaders. A typical loader consists of a loader attachment which is readily adapted to be attached to a tractor. The structure generally comprises a rigid frame having a pair of laterally spaced arms pivotally connected to the frame for vertical movement. A material handling means, such as a scoop, is pivotally connected to the arms for movement therewith from the ground to a lifted position. The tractor furnishes the power for lifting the scoop and its supporting structure. Loaders of this type are especially adaptable for use on farms where they are utilized for a various number of chores, such as manure handling, grain handling, etc.

In the handling of manure and other materials, the loader is forced into the mass of material by the traction of the tractor. The greatest stress on the loader and the tractor is generally found during the beginning of the lifting operation. At this point the stress is great since the material which has filled the scoop must first be broken free of its mass. This condition is especially found prevalent during the winter months when the material or manure is generally in a frozen condition and is very tightly packed. This initial lifting force then exerts an unusual amount of pressure on the body of the tractor which therefore must be built to withstand these unusual loads.

It is the principal object of this invention to provide an improved loader attachment for a tractor, said attachment including a material moving scoop which is adapted to be supported on the ground during the initial loading and ground breaking operation thereby carrying and absorbing the heaviest stresses independently of the tractor.

Another object is to provide an improved scoop for a loader attachment, said scoop having a material engaging edge which may be raised vertically with respect to the heel of the scoop which is resting upon and is pivotally supported on the ground.

Another object is to provide an extensible power means and linkage therefor for tilting the scoop portion of a loader attachment, said tilting movement being effective to break loose the material from its mass during the initial operation of the scoop.

Still another object is to provide a power

2 loader having extensible power means for tilting the material handling scoop while said scoop is resting on the ground, said extensible power means also being operable to raise the scoop to a loading position.

Still another object is to provide a fluid pressure means for locking the scoop of a power loader in a tilted position, said tilted position being initially assumed during the engagement of the scoop with the material to be handled.

Another object is to provide a fluid control means for dumping the material handling scoop, said control means also being effective to permit angular adjustment of said scoop.

Other objects will become more readily apparent as the description proceeds when read in conjunction with the accompanying drawings in which:

Fig. 1 is a side elevational view of a tractor having a power loader connected thereto;

Fig. 2 is a plan view of the same;

Fig. 3 is a side elevational diagrammatic view showing the first stage of the operation of a tractor-mounted power loader;

Fig. 4 is a diagrammatic side elevational view showing the tractor-mounted power loader in its extreme lifted position;

Fig. 5 is a diagrammatic elevational view of a tractor-mounted power loader showing the same in a dumped position;

Fig. 6 is a detail sectional view taken along the line 6—6 of Fig. 2;

Fig. 7 is a detail plan view of a fluid pressure means for locking a tractor-mounted loader scoop in a tilted position; and Fig. 8 is a sectional view taken along the line 8—8 of Fig. 7.

Referring particularly to Figs. 1 and 2, a tractor is generally designated by the reference character 10. The tractor 10 includes a longitudinal body portion 11 mounted on front rolling supports 12 and rear rolling supports 13. A rear axle structure 14 projects laterally outwardly from the longitudinal body portion 11. An operator's station 15 is within close proximity to a steering mechanism 16.

A loader supporting structure is generally designated by the reference character 17. The supporting structure 17 includes a pair of laterally spaced longitudinal members 18 which are secured at their rearmost ends to the rear axle structure 14 by means of vertical plates 19 and bolts 20. The foremost portion of the longitudinal members 18 are connected by means of a transversely extending angle bar 21 and plate members 22 which are suitably fastened to the body of the tractor by means of bolts 23. Positioned at each side of the tractor and rigidly connected to the longitudinal members 18 are a pair of upwardly converging members 24. The upper portions of the converging members 24 are connected by means of vertical angle members 25. The angle members 25 have connected thereto bearing plates 26 through which a transverse shaft 27 extends for pivotal movement. A bracket 28 is rigidly secured to the rear portion of the vertical angle members 25 and has connected thereto a transverse beam member 29.

A loader frame is generally indicated by the reference character 30 and includes forwardly and downwardly extending frame members 31 which are pivotally connected to the brackets 28 as indicated at 32. Connected to the forward portion of each side frame member 31 is a vertical plate 33. Transverse torque members 34 are rigidly secured to each plate 33 thereby forming a rigid frame structure. A pair of laterally spaced upright or vertical arms 35 are positioned at the foremost portion of the laterally spaced vertical plates 33. The arms 35 are normally in vertical or upright position during the lowered position of the loader. The terms "upright" or "vertical" are, therefore, merely used in an identifying manner rather than in a restrictive sense since, as shown in Figures 4 and 5, the arms 35 are no longer truly "upright" or "vertical" when the loader is in its maximum raised position. Each upright arm 35 is pivotally connected intermediate its ends about a transverse axis to the plates 33 as indicated by the reference character 36. The upright arms 35 are oscillated about the connection 36 by means of laterally spaced crank arms 37. The crank arms 37 are pivotally connected to laterally spaced longitudinal links 38 which are in turn pivotally connected to the upright arms 35 by means of a laterally extending shaft 39. The crank arms 37 are rigidly secured to a transverse shaft 37' which is journaled in bearing portions 38' rigidly carried by the vertical plates 33.

A load carrying means or scoop 40 is pivotally connected to and between the upright arms 35. The scoop 40 includes side portions 41, a closed end or heel portion 42 and a load engaging edge 43. As best shown in Fig. 1 the pivotal point of connection 41', between the scoop 40 and the upright arms 35, is forwardly of the heel of the scoop and some distance above the ground. The position of this connection provides for a pivotal tilting of the scoop about its heel as will presently become more apparent.

Power for tilting and raising the loader scoop is provided by means of laterally spaced extensible power means 44. Each extensible power means 44 includes a fluid cylinder 44' which is pivotally connected to each of the vertical angle members 25. A piston 45 is mounted for reciprocation within each cylinder 44' and has connected thereto a piston rod 46. The piston rod 46 is connected at its forward end to a crank member 47 which is best shown in the broken away portion of the construction as shown in Fig. 2.

Referring particularly to Figs. 2 and 6, a pair of triangular laterally spaced plate members 48 are rigidly secured to the foremost torque member 34. The triangular plate members 48 include a pair of bearing sleeves 49 through which the transverse shaft 37' extends and on which it is journaled. Substantially centrally positioned between the bearing sleeves 49 are a pair of depending arms 50 which are rigidly secured for rotational movement with the transverse shaft 37'. As indicated at 51 and 52 in Fig. 6, a fluid pressure means or check cylinder 53 is connected to and between the depending arms 50 and the triangular plates 48. As best shown in Figs. 7 and 8, the fluid pressure means 53 includes a cylinder 54. A piston 55 is mounted within the cylinder 54 for reciprocation and has connected thereto a piston rod 56. A bolt 57 secures the end of the piston rod 56 to the depending arms 50. A bolt 57' firmly anchors the end of the cylinder 54 between the triangular plate members 48.

As best shown in Fig. 8, the fluid pressure means 53 includes a valve construction generally indicated by the reference character 58. The valve construction 58 further includes a valve housing 59 provided with a reservoir chamber 60. The valve construction 58 is preferably made of cast iron construction and includes a bored opening 61. The bored opening 61 is threaded at each of its ends and has screwed therein a threaded valve body 62. The threaded valve body 62 is provided with a bored chamber 63 which has an internally threaded portion 64. A threaded plug 65 is screwed into the threaded portion 64 of the threaded valve body 62. Slidably positioned within the bored chamber 63 is a sliding thrust member 66 having openings 67 which place one end of the chamber 63 in communication with its other end. The sliding thrust member 66 is continuously forced in one direction by means of a spring 68. A conduit 69 provides for communication of the chamber 63 with a conduit 70. The threaded plug 65 is formed with a valve seat 71 which supports the ball valve 72. The ball valve 72 is compressed against the valve seat 71 and shuts off a bored chamber 73 formed in the threaded plug 65. The chamber 73 is in communication with inlets 74 which in turn are in communication with openings 75 of the valve body 62. The openings 75 are in communication with a conduit 75'. The conduit 75' is in communication with one end of the cylinder 54 and the conduit 70 is in communication with the other end of the cylinder 54. The threaded plug 65 has a bore or guideway 76 in which a plunger 77 reciprocates.

The plunger 77 forms part of a piston structure 78 which is reciprocable within the bored opening 61. A packing disk 79 is placed in back of the piston structure 78 for suitably sealing the bored opening 61. A projecting circular portion 80 is integral with the piston structure 78 and is in abutment with a threaded cap 81 which is screwed into the end of the bored openings. The cap 81 is provided with an opening 82 in which a conduit 83 is connected. An opening 84 provides for communication with the bore 61 and the reservoir 60.

As best shown in Figure 1, an extensible fluid pressure means is generally indicated by a reference character 85. The pressure means 85 includes a cylinder 86 which is pivotally connected to one of the vertical angle members 25 and extends upwardly with respect thereto. The cylinder 86 has a piston 87 reciprocally mounted therein. The piston 87 is connected to a piston rod 88 which in turn is connected at its end between the crank elements 89. As best shown in Fig. 2, the crank elements 89 are rigidly connected to the transverse shaft 27 and are adapted to rotate with said shaft. A pair of upwardly extending arms 90 are each secured to the ends of the transverse shaft 27 and each have connected thereto a downwardly extending link 91. The links 91 are each connected to a jack-knife link construction generally referred to by the reference character 92. As best shown in Figs. 1, 2, and 3, the jack-knife link construction 92 includes an upper link 93 and a lower link 94. The upper and lower links 93 and 94 are pivotally connected together as indicated at 95. As shown in Fig. 5 and indicated by the reference character 96, each lower link is pivotally connected to the rear portion of the scoop 40. As best shown in Fig. 4, each upper link 93 is pivotally connected to each link 91 as indicated at 97.

The fluid pressure means for controlling the action of the extensible means 44 and 85 includes a control rod 98 which is readily operable from the operator's station 15. The control rod 98 is associated with a fluid reservoir and pump (not shown) which is mounted within the longitudinal body 11 of the tractor. The reservoir and pump is of conventional design and need not be further described for the purpose of this invention. A conduit 99 is in communication with the fluid reservoir at one end and is connected at its other end to a fluid control box 100. The fluid control box 100 is mounted in proximity to the operator's station 15 and is at all times within manual control of the operator. The manual control box 100 includes control levers 101, 102, and 103. The control lever 101 may be actuated for regulating fluid to a conduit 104 which is in communication with the foremost portion of the cylinder 44'. Fluid through a conduit 105 may also be regulated by the control lever 101, the conduit 105 being in communication with the other end of the cylinder 44'. The control lever 102 may be actuated to supply fluid to a conduit 106 which is in communication with the cylinder 86. The control lever 103 may be actuated to supply fluid to a flexible conduit 107 which is in communication by means of pipe joints 108 with the conduit 83 leading to the valve construction 58. Cross feed conduits 109 and 110 are respectively in communication with conduits 104 and 105 for supplying fluid to the cylinder 44' on the opposite side of the tractor. For the purpose of clarity, in Figures 2, 3, 4, and 5, the conduits have been broken off or omitted.

During the cycle of its operation, the material handling scoop 40 is resting upon the ground as shown in Figure 1. Forward movement of the tractor shoves the scoop 40 into the mass of material to be handled. Since this mass of material may under various conditions be very compact, frozen, or otherwise difficult to break loose, it is therefore first desired to tilt the scoop, thereby loosening the material so that the loaded scoop may be readily lifted.

The operator initially actuates lever 101 by rocking the same in one direction, whereupon fluid flows through the conduit 104 into the cylinder 44'. The fluid pressure thereupon actuates the piston 45 to move rearwardly. As the piston 45 moves rearwardly, the piston rod 46 rocks the shaft 37' in a clockwise direction. As the shaft 37' is rocked in the clockwise direction, the crank arm 37 forces the links 38 rearwardly thereby causing pivotal movement of the upright arms 35 about their transverse axis 36. By virtue of the counterclockwise oscillation of the arms 35 movement of the scoop 40 is effected. By virtue of the jack-knife linkage arrangement 92, which is pivotally connected to the links 91, and in view of the oscillating movement of the arms 35, the material engaging edge of the scoop 40 is lifted vertically and the scoop is rotated with the heel thereof being supported on the ground. The jack-knife linkage causes the upward tilting of the scoop in a rapid manner without substantial oscillatory movement of the arms 35. The exact action of the jack-knife linkage and the movement of the scoop 40 is as follows: As the arms 35 are pivoted with their upper ends moving rearwardly, the lower ends of the arms 35 are moved forwardly a short distance, thus moving the scoop forwardly. Simultaneously the upper ends of the links 93 are moved rearwardly and during this movement they pivot on the links 91 also causing the links 91 to pivot on the arms 90. The arms 90 are at this point stationary since the jack 85 is not in operation. The pivoted points of connection of the links 91 to the links 93 also move downwardly and rearwardly. As the ends of the links 91 are moved downwardly, they pull the links 94 bodily rearwardly and since these links 94 are pivotally connected to the upper rear end of the scoop, the upper rear end of the scoop is moved toward the tractor and the lower rear end is moved forwardly by the arms 35 causing rapid upward tilting of the scoop. As best shown in Fig. 3, the upward tilting movement of the scoop is about its heel, the heel during this stage of operation remaining continuously on the ground and being supported thereby. Thus it can be seen that the initial force required to break the material loose from its mass is carried on the ground independently of the tractor during this initial lifting stage. Thus the tractor structure is spared from the initial extraordinary stress load. The tilting movement of the scoop can be quite accurately compared to the manual operation of an individual handling a shovel, since the forward motion of the shovel and the subsequent tilting of the same is very similar.

As the shaft 37' is forced to rotate in a clockwise direction by means of the action of the cylinder and pistons 44' and 45, the depending arms 50 also move in a clockwise direction. As the depending arms 50 move in this clockwise direction, the piston 55 within the cylinder 54 is drawn outwardly to its extreme extended position. As this piston 55 is drawn toward its extended position, fluid within the cylinder 54 is forced through the conduit 75' and through the openings 75 and 74. The fluid pressure within the bored chamber 73 thereupon forces the ball valve 72 off of its valve seat 71. Fluid thereupon is free to by-pass the ball valve 72 and pass through the openings 67 and 69 and thereupon through the conduit 70 into the cylinder 54. The fluid, therefore, now is in back of the piston 55 which is in its extended position and by virtue of the one way check action of the ball valve 72, the piston 65 is now locked. Thus the scoop 40 is locked in the tilted position which it has previously assumed. The reservoir is filled with a sufficient amount of hydraulic fluid so that the system is adequately supplied at all times. It also compensates for the different volumes of fluid that may be needed during different positions of the piston within the cylinder. The system is conventional in hydraulic brake systems for vehicles and need not further be described.

The operator is now ready to raise the loaded scoop 40 from the ground. The operator thereupon rocks the control valve 101 whereby fluid is pumped to the conduit 105, which in turn causes the piston 45 to move forwardly.

The fluid which remains in front of the piston 45 is now returned by means of the conduit 104 to the pump and reservoir. As the piston 45 moves forwardly, pressure is exerted upon the crank members 47. Since the crank members 47 and the transverse shaft 37' are now locked against movement by the cylinder 54, continued forward movement of the piston 45 effects raising of the scoop 40 from the ground.

As shown in Fig. 4, the piston 87 within the cylinder 86 is in its extended position during the lifting stages of the scoop and fluid pressure within the cylinder 86 keeps the piston 87 in this position. When the operator desires to release the scoop for dumping, he simply actuates the manual control lever 102, whereupon fluid within the cylinder 86 is free to return through the conduit 106 to the reservoir and pump. The upwardly extending arms 90 thereupon rotate in a clockwise direction, thereby permitting opening of the jack-knife linkage 92 which in turn allows the scoop 40, due to gravity, to assume the dumped position shown in Fig. 5. By manipulating the control lever 102 the operator can return the scoop 40 to its normal operating position, since fluid will reenter the cylinder 86 and cause the extension of the piston. It is of prime importance to note that by virtue of the extensible power-lift means 85, the operator can tilt the scoop 40 in a raised position to any desired angle, thereby in turn controlling the amount of material which is dumped. Thus only a portion of the material contained within the scoop may be dumped at any one time if so desired, and the amount so dumped can be accurately controlled. This feature therefore is extremely advantageous, where quantity control of dumping is necessary.

The operator is now ready to return the scoop 40 to the ground. He thereupon reverses action of the cylinder and piston arrangements 44' and 45, thereby lowering the scoop. At the same time it is desired to return the scoop to its level position, indicated in Fig. 1, and it is therefore necessary to unlock the fluid-pressure-means or check cylinder 53. The operator thereupon rocks control valve lever 103 causing fluid to be pumped into the conduits 107 and 83, which in turn causes fluid under pressure to press against the circular portion 80 of the piston structure 78. The force against the piston structure 78 causes movement of the plunger 77 against the ball valve 72, thereby displacing the same from the valve seat 71. The fluid pressure which retains the piston 55 and piston rod 56 in its extended position is thereupon released and is free to flow from the cylinder 54 by means of the conduit 70 past the ball valve 72 and through the conduit 75' into the opposite end of the cylinder 54. The piston 55 therefore returns to the position shown in Fig. 7, and as shown in Fig. 6 the depending arms 50 are returned to their normal position. In this stage of operation of the valve construction 58 it is of course apparent that any excess hydraulic fluid not needed in the cylinder may be returned to the reservoir 60. From the description, it should be noted that movement of the fluid throughout the fluid pressure means 53 is occasioned entirely by the movement and operation of the cylinders 44', the fluid pressure means 53 operating primarily as a check valve construction, through which the flow may be controlled by means of the manual control valve 103 near the operator's station.

It is now readily apparent that the objects of the invention have been fully achieved. A unique construction is provided wherein the operator has full and complete control of all movements of the power loader. By virtue of the tilting arrangement of the scoop the extreme initial forces which the scoop must assume are carried on the ground independently of the tractor. During the lifting of the scoop the operator has complete control in determining what angularity the scoop should take and controlled quantity dumping is effected.

It is to be understood that modifications may be made in this construction which do not depart from the spirit of the invention as disclosed nor the scope thereof as defined by the appended claims.

What is claimed is:

1. A loading attachment for a tractor comprising a loader frame, said frame including laterally spaced longitudinally extending frame members pivotally mounted on the tractor and extending forwardly with respect thereto, normally vertical arms connected to said frame members for swinging movement about a transverse axis, a scoop pivotally connected to said arms, a jack-knife linkage having one link pivotally connected to said scoop and a second link pivotally connected to said arms, a third link means pivotally connected to said jack-knife linkage and pivotally connected to said loader frame, and power-actuating means included on the tractor for swinging said arms whereby one end of said third link means moves said jack-knife linkage downwardly and rearwardly and said links cooperate simultaneously to tilt a portion of said shovel rearwardly and said arms move a portion of said scoope forwardly thereby raising the material engaging portion of said scoop, and whereby a portion of said scoop will be supported on the ground thereby carrying the initial lifting force on the ground independently of said tractor.

2. A loading attachment for a tractor having a longitudinal body supported on front and rear ground wheels comprising, a supporting structure on the tractor, a loader frame associated with said tractor, said loader frame including forwardly and downwardly extending side frame members pivotally connected to said supporting structure, laterally spaced normally upright arms pivotally connected intermediate their ends to said loader frame for oscillating movement about a transverse axis, a material carrying scoop positioned forwardly of the tractor, said scoop having a material engaging edge, means pivotally connecting the lower ends of said upright arms to said scoop about a transverse axis, said pivotal point of connection being located forwardly of the heel of said scoop when said scoop is positioned in a normal ground engaging position, a first link pivotally connected to a rear portion of said scoop, a second link pivotally connected to said first link and to the uppermost end of said upright arm, a longitudinal member pivotally connecting said links to said supporting structure, and a power-actuating means included on the tractor and connected to said upright arms for oscillating the same about a transverse axis, whereby said links and upright arms cooperate to initially raise the material engaging edge of said scoop from the ground, and whereby the heel of said scoop rotates and is supported on the ground thereby carrying the initial lifting force on the ground independently of the supporting structure and the tractor.

3. A loading attachment for a tractor having a longitudinal body supported on front and rear ground wheels comprising, a supporting structure on the tractor, a loader frame connected to said supporting structure, normally upright arms pivotally connected intermediate their ends to said loader frame for oscillating movement about a transverse axis, a material carrying scoop, means pivotally connecting said upright arms to said scoop about a transverse axis, a first link pivotally connected to said scoop, a second link pivotally connected to said first link and to said upright member, means pivotally connecting said links to said supporting structure, and a power-actuating means included on the tractor and connected to said upright arms for oscillating the same about a transverse axis whereby said links and upright members cooperate to initially raise the material engaging edge of said scoop from the ground, and whereby the heel of said scoop rotates and is supported on the ground thereby carrying the initial lifting force on the ground independently of the supporting structure and the tractor.

4. A loading attachment for a tractor comprising a loader frame pivotally connected to the tractor, a material moving scoop, a normally vertical arm connected intermediate its ends to said loader frame for pivotal movement about a transverse axis, means pivotally connecting said scoop to said vertical arm for tilting movement about a transverse axis, linkage means pivotally connecting said vertical arm and said scoop to said tractor, a crank arm connected to said loader frame for pivotal movement about a transverse axis, means connecting said crank arm to said vertical arm, power-actuating means included on the tractor operable in one direction to move said crank arm whereby said vertical arm and said linkage means is simultaneously actuated to tilt said scoop on the ground and thereby raise its material-engaging edge free of the ground, and means for locking said crank arm and said scoop against pivotal movement whereby movement of said power-actuating means in a second direction will exert a force against said locked crank arm and thereby raise said loader frame and said tilted scoop free of the ground.

5. A loading attachment for a tractor comprising a loader frame pivotally connected to the tractor, a material moving scoop, a normally vertical arm connected intermediate its ends to said loader frame for pivotal movement about a transverse axis, means pivotally connecting said scoop to said vertical arm for tilting movement about a transverse axis, linkage means pivotally connecting said vertical arm and said scoop to said tractor, a crank arm connected to said loader frame for pivotal movement about a transverse axis, means connecting said crank arm to said vertical arm, power-actuating means included on the tractor and operable to move said crank arm whereby said vertical arm and said linkage means is simultaneously actuated to tilt said scoop on the ground and thereby raise its material-engaging edge free of the ground, and means for locking said crank arm and said scoop against pivotal movement whereby continued movement of said power-actuating means will exert a force against said locked crank arm and thereby raise said loader frame and said tilted scoop free of the ground.

6. A loading attachment for a tractor having a longitudinal body mounted on ground wheels, comprising a loader frame pivotally carried by the tractor, said loader frame including laterally spaced side members, a material moving scoop, a pair of normally vertical arms, means connecting each vertical arm intermediate its ends to each side member for pivotal movement about a transverse axis, means pivotally connecting said scoop to said vertical arms for tilting movement about a transverse axis, linkage means connecting said scoop to the tractor, a transversely extending shaft pivotally carried on said laterally spaced side members, crank arms connected to said shaft for pivotal movement therewith, means connecting said crank arms to said vertical members, an extensible pressure device included on the tractor and connected to each crank arm for initially moving said crank arm to a locking position thereby tilting said scoop with a portion of said scoop being continuously supported on the ground, and a fluid pressure means connected to said transverse shaft and said loader frame for locking said crank arms in a locked position whereby subsequent movement of said extensible pressure means and said crank arm will be operable to raise said loader frame and said scoop from the ground.

7. A loading attachment for a tractor having a longitudinal body mounted on ground wheels comprising, a loader frame pivotally carried by the tractor, said loader frame including laterally spaced side members, a material moving scoop, a normally vertical arm pivotally connected intermediate its ends to each side member for pivotal movement about a transverse axis, means pivotally connecting said scoop to each vertical arm for tilting movement about a transverse axis, a transversely extending shaft pivotally carried on said laterally spaced side members, crank arms connected to said shaft for pivotal movement therewith, means connecting said crank arms to said vertical members, an extensible pressure device included on the tractor and connected to each crank arm for initially moving said crank arm in one direction into a locking position thereby tilting said scoop with a portion of said scoop being continuously supported on the ground, and a fluid pressure means connected to said transverse shaft and said loader frame for locking said crank arms in the locked position whereby subsequent movement of said extensible pressure means in a reverse direction will be operable to raise said loader frame and said scoop from the ground.

8. A loading attachment for a tractor having a longitudinal body supported on front and rear ground wheels comprising, a supporting structure on the tractor, a loader frame associated with said tractor, said loader frame including side frame members connected to said supporting structure, laterally spaced normally upright arms pivotally connected intermediate their ends to said loader frame for oscillating movement about a transverse axis, a material-carrying scoop having a material-engaging edge, means pivotally connecting said upright arms to said scoop about a transverse axis, said point of connection being located near the heel of said scoop, a first link pivotally connected to a portion of said scoop, a second link pivotally connected to said first link and to one of said upright arms, a longitudinal member pivotally connecting said links to said supporting structure, and a power-actuating means included on the tractor and connected to said upright arms for oscillating the same about a transverse axis whereby said links and upright arms cooperate to initially raise the material-engaging edge of said scoop from the ground and whereby the heel of said scoop rotates and is supported on the ground thereby carrying the initial lifting force on the ground independently of the supporting structure and the tractor.

9. A loading attachment for a tractor having a longitudinal body supported on front and rear ground wheels comprising, a supporting structure on the tractor, a loader frame associated with said tractor, said loader frame including side frame members pivotally connected to said supporting structure, normally upright arms pivotally connected intermediate their ends to said loader frame for oscillating movement about a transverse axis, a material-carrying scoop positioned forwardly of the tractor, said scoop having a material-engaging edge, means pivotally connecting the lower ends of said upright arms to said scoop about a transverse axis, said pivotal point of connection being located forwardly of the heel of said scoop, a first link pivotally connected to a portion of said scoop, a second link pivotally connected to said first link and to one of said upright arms, means pivotally connecting said links to said supporting structure, and a power-actuating means included on the tractor and connected to said upright arms for oscillating the same about a transverse axis whereby said links and upright arms cooperate to initially raise the material-engaging edge of said scoop from the ground and whereby the heel of said scoop rotates and is supported on the ground thereby carrying the initial lifting force on the ground independently of the supporting structure and the tractor.

10. A loading attachment for a tractor having a longitudinal body supported on front and rear ground wheels comprising, a supporting structure on the tractor, a loader frame associated with said tractor, said loader frame including forwardly and downwardly extending side frame members pivotally connected to said supporting structure, laterally spaced normally upright arms pivotally connected intermediate their ends to said loader frame for oscillating movement about a transverse axis, a material-carrying scoop positioned forwardly of the tractor, said scoop having a material-engaging edge, means pivotally connecting the lower ends of said upright arms to said scoop about a transverse axis, said pivotal point of connection being located forwardly of the heel of said scoop, a first link pivotally connected to a rear portion of said scoop, a second link pivotally connected to said first link and to the uppermost end of one of said upright arms, a longitudinal member pivotally connecting said links to said supporting structure, and a power-actuating means included on the tractor and connected to said upright arms for oscillating the same about a transverse axis whereby said links and upright arms cooperate to initially raise the material-engaging edge of said scoop from the ground and whereby the heel of said scoop rotates and is supported on the ground thereby carrying the initial lifting force on the ground independently of the supporting structure and the tractor.

11. A loading attachment for a tractor comprising a loader frame said frame including laterally spaced, longitudinally extending side members pivotally connected to the tractor and extending forwardly with respect thereto, a material moving scoop, for pivotal tilting movement about a transverse axis, an extensible power means supported by the tractor, a normally vertically extending arm pivotally connected to the side members, means pivotally connecting the lower portion of said vertical arm to a lower rearward portion of said scoop, linkage means pivotally connected to an upper rearward portion of said scoop, means pivotally connecting the linkage means to the loader frame, means pivotally connecting the extensible power means to the upper portion of said arm, said extensible power means being adapted to move in one direction thereby pivoting said arm to tilt the toe of said scoop from the ground whereby the heel of said scoop is supported on the ground, and a fluid pressure extensible device supported on the loader frame and connected to the scoop, said fluid pressure extensible device being adapted to lock said scoop in its tilted position, the extensible power means being movable in a second direction thereby raising said frame and said scoop.

GORDON G. McNAMARA, Jr.

REFERENCES CITED

The following references are of record in the file of this patent:

UNITED STATES PATENTS

| Number | Name | Date |
|---|---|---|
| Re. 15,950 | Butler | Nov. 18, 1924 |
| 1,281,532 | Dillig | Oct. 15, 1918 |
| 2,146,807 | Ferari | Feb. 14, 1939 |
| 2,227,624 | Benbow et al. | Jan. 7, 1941 |
| 2,387,656 | Gledhill | Oct. 23, 1945 |
| 2,413,097 | Barker | Dec. 24, 1946 |
| 2,416,893 | Barker | Mar. 4, 1947 |
| 2,418,251 | Drott | Apr. 1, 1947 |
| 2,440,010 | Hall | Apr. 20, 1948 |
| 2,449,212 | Fraga | Sept. 14, 1948 |
| 2,455,474 | Drott et al. | Dec. 7, 1948 |
| 2,490,155 | Pfau et al. | Dec. 6, 1949 |